Aug. 25, 1964 F. BOBON ET AL 3,146,416

TUNNEL DIODE BIASED IN NEGATIVE RESISTANCE REGION BY ZENER DIODE POWER SUPPLY MEANS

Filed Dec. 20, 1962

United States Patent Office 3,146,416

Patented Aug. 25, 1964

3,146,416

TUNNEL DIODE BIASED IN NEGATIVE RESISTANCE REGION BY ZENER DIODE POWER SUPPLY MEANS

Fritz Bobon, Berlin-Wilmersdorf, and Günter Meewes, Bremen-Neue Fahr, Germany, assignors to Siemens & Halske Aktiengesellschaft, Berlin, Germany, a corporation of Germany Filed Dec. 20, 1962, Ser. No. 246,062
Claims priority, application Germany Dec. 21, 1961
5 Claims. (Cl. 334—40)

Our invention relates to an electric circuit applicable as a negative resistance component for compensating and other electrical purposes, such as for reducing the damping of an oscillating system.

The so-called tunnel diodes, based upon the quantum-mechanical tunnel effect according to Esaki, exhibit a descending portion in their current-voltage characteristic. When a tunnel diode is being operated so that its working point is on this descending portion of the characteristic, the diode constitutes a negative resistance applicable, among other purposes, for compensating the damping of oscillating circuits. However, for obtaining a stable working point on the descending portion of the current-voltage characteristic, the direct-voltage source of a tunnel diode must have an internal resistance smaller than the amount of negative resistance constituted by the tunnel diode itself.

It has been proposed to provide as feed voltage for a tunnel diode operating on the descending branch of its current-voltage characteristic, the voltage drop of a diode traversed by the feeding direct current and adjusted for saturation current in the forward direction.

It is an object of our invention to provide a tunnel-diode circuit combination of negative resistance in which a particularly low internal resistance of the direct voltage source is more reliably secured by means of utmost simplicity.

To this end, and in accordance with our invention, we connect a tunnel diode, to be energized with direct current for operation on the descending branch of its current-voltage characteristic, with a Zener diode which, in turn, is connected, preferably in sereis with a voltage-drop resistor, to a direct voltage source, the connection between the Zener diode and the tunnel diode being such that the voltage drop of the Zener diode constitutes the feed voltage for the tunnel diode, and the Zener diode being poled and adjusted for operation in the Zener range requiring the passage of current through the Zener diode in the blocking direction of the latter.

According to another feature of our invention, it is preferable to connect the tunnel diode through at least one inductance coil with the Zener diode. One and the same Zener diode may also be used for supplying direct current to a plurality of tunnel diodes. According to still another feature of the invention two Zener diodes of respectively different voltage drop, each forming part of a voltage divider across voltage supply means, are connected to the tunnel diode in voltage-differential relation so that the difference of the two Zener voltage drops constitutes the source voltage for the tunnel diode.

The invention will be further described with reference to the drawing in which.

Figure 1:
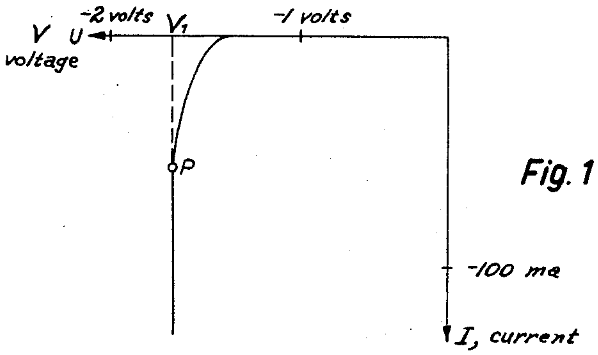
FIG. 1 is explanatory and shows a graph exemplifying the current-voltage characteristic of a Zener diode.

The graph shown in FIG. 1 exemplifies a typical current-voltage characteristic of a Zener diode. The abscissa indicates negative voltage values in volt, and the ordinate negative current values in milliamp. As is apparent from the current-voltage characteristic, the differential resistance of the Zener diode in the range of Zener operation is very small. This applies, for example, to the operating point P at the voltage $V_1$ corresponding for example, to a value between —1 and —2 volts at a current of less than —100 milliamps. The available constant Zener voltage is ample for the operation of a tunnel diode requiring, for example, a voltage range from approximately 0.05 to 0.15 volt for operation in the descending (negative) portion of its current-voltage characteristic at a current of approximately 1 milliamp. or less. A Zener diode, properly connected to a voltage supply and to the tunnel diode, as exemplified by FIGS. 2 and 3 described below, is thus capable of furnishing the necessary voltage to the tunnel diode while simultaneously constituting a source of extremely small internal resistance, thus tending to maintain the tunnel diode in stable operation within the limited range of the descending portion of its characteristic.

Figures 2, 3:
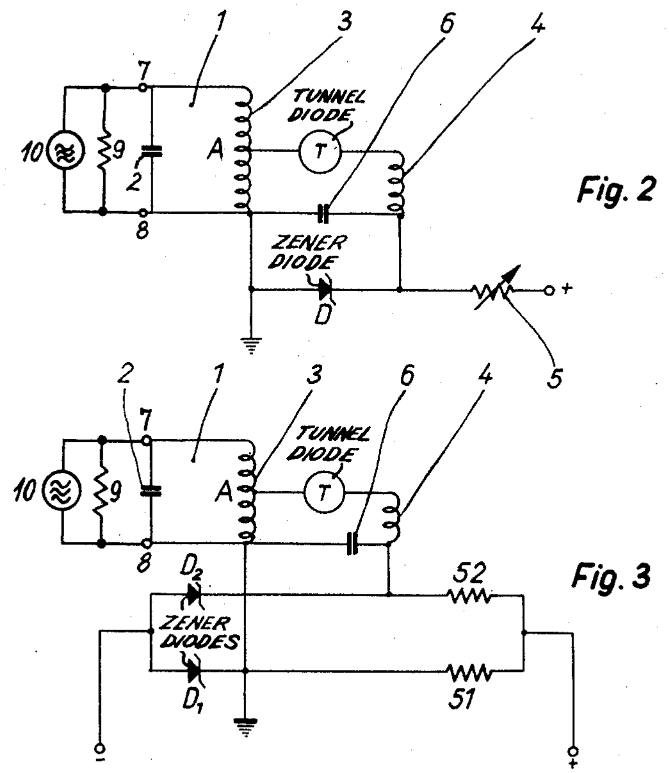
FIG. 2 is a schematic circuit diagram of a diode connection according to the invention employed for reducing the damping of a tank circuit.
FIG. 3 is a modified circuit diagram similar to that of FIG. 2 but provided with two Zener diodes.

FIG. 2 shows a tank circuit 1 composed of a capacitance 2 and an inductance 3 and intended to operate with low or negligible damping, for example as a component of an oscillator network that furnishes a carrier frequency in communication or measuring systems. Connected to a tap point A of the inductance winding 3 is a tunnel diode T whose negative resistance is to be utilized for compensating the damping of the tank circuit. The tunnel diode T is connected in series with a high-frequency throttle coil 4 across a Zener diode D which, together with a preferably adjustable series resistor 5, forms a voltage divider energized from a voltage supply whose positive pole is denoted by (+). By virtue of this connection, the feeder voltage for the tunnel diode is taken from the Zener diode D which thus constitutes the source with respect to the tunnel diode. Relative to that source, part of the inductance winding 3 and the high-frequency inductance coil 4 are connected in series with the tunnel diode. A capacitor 6 connected across the diode D forms a high-frequency shunt relative thereto.

Since, as a rule, the Zener voltages are higher than the feed voltage required at a tunnel diode, it is often of advantage to employ as feed voltage for the tunnel diode the difference voltage of two Zener diodes having respectively different voltage drops. This is the case in the embodiment of FIG. 3 which to some extent is similar to that of FIG. 2, corresponding components being denoted by the same respective reference characters in both illustrations. The circuit according to FIG. 3 is provided with two different Zener diodes $D_1$ and $D_2$ each connected in series with a resistor 51 or 52 between the positive and the negative poles of a direct-voltage supply. Each series connection of Zener diode and resistor thus form a voltage divider, and the feeder network for the tunnel diode T may be looked upon as constituting a bridge network in which two adjacent branches are constituted by the tunnel diodes and the other two branches by the two resistors, the bridge being energized in one diagonal and containing the tunnel diode in the output diagonal. By suitable choice of the Zener diodes $D_1$ and $D_2$, a fixed voltage difference appears in the output diagonal and is supplied to the tunnel diode T as feeder voltage in the same manner as explained with reference to FIG. 2.

In FIGS. 2 and 3 the terminals 7 and 8 of the tank circuit connect to a load resistor 9 and a high-frequency signal source 10.

We claim:

1. In an electric circuit of negative resistance having a tunnel diode and direct-voltage supply means connected to said tunnel diode and having at said tunnel diode a feed voltage rated for operation of said tunnel diode on the descending branch of its current-voltage characteristic, said supply means comprising a Zener diode and direct-current means connected to said Zener diode and rated for saturated operation of said Zener diode in the blocking direction, and circuit means connecting said Zener diode across said tunnel diode, the voltage drop of said Zener diode being said feed voltage for said tunnel diode.

2. In an electric circuit of negative resistance having a tunnel diode and direct-voltage supply means connected to said tunnel diode and having at said tunnel diode a feed voltage rated for operation of said tunnel diode on the descending branch of its current-voltage characteristic, said supply means comprising a Zener diode and direct-current means connected to said Zener diode and rated for saturated operation of said Zener diode in the blocking direction, circuit means connecting said Zener diode across said tunnel diode and comprising inductance means in series connection between said two diodes, the voltage drop of said Zener diode being said feed voltage for said tunnel diode.

3. In an electric circuit of negative resistance having a tunnel diode and direct-voltage supply means connected to said tunnel diode and having at said tunnel diode a feed voltage rated for operation of said tunnel diode on the descending branch of its current-voltage characteristic, said source comprising two Zener diodes and direct-current supply means connected to said Zener diodes for saturation of both in the blocking direction, said two Zener diodes having respectively different voltage drops, circuit means connecting said two Zener diodes in voltage-differential relation to said tunnel diode so that the difference of said two voltage drops constitutes said feed voltage for said tunnel diode.

4. In an electric circuit according to claim 3, said two Zener diodes forming two adjacent branches respectively of a bridge network, two ohmic resistors in the other two branches of said network, said bridge network having its input diagonal connected to said direct-current supply means, said circuit means being connected in the output diagonal of said network and comprising inductance means in series with said tunnel diode.

5. Circuit according to claim 2 comprising an oscillator tank circuit having an inductance member, said inductance means forming part of said member, whereby said tunnel diode reduces damping of said tank circuit.

No references cited.